United States Patent
Nicholls et al.

(10) Patent No.: US 6,363,414 B1
(45) Date of Patent: Mar. 26, 2002

(54) METHOD FOR CONVERTING AN EMAIL MESSAGE TO A DIFFERENT FORMAT AND RETRANSMITTING TO A LOCATION OTHER THAN RECIPIENT ADDRESS INFORMATION IN THE EMAIL MESSAGE

(75) Inventors: Timothy J. Nicholls, Standon; Robert W. Allport, Harlow; Stephen Kelley, Welwyn Garden, all of (GB); Christopher J. Capelli, Millwood, NY (US)

(73) Assignee: Pitney Bowes Ltd., Harlow (GB)

( * ) Notice: Subject to any disclaimer, the term of this patent is extended or adjusted under 35 U.S.C. 154(b) by 0 days.

(21) Appl. No.: 09/222,195

(22) Filed: Dec. 29, 1998

(51) Int. Cl.[7] .......................... G06F 15/16; G06F 15/173
(52) U.S. Cl. ........................ 709/206; 709/238; 709/246
(58) Field of Search ................................. 709/206, 207, 709/246, 238; 704/270.1

(56) References Cited

U.S. PATENT DOCUMENTS

| | | | |
|---|---|---|---|
| 5,333,266 A | * 7/1994 | Boaz et al. | 709/206 |
| 5,465,206 A | 11/1995 | Hilt et al. | 705/40 |
| 5,479,411 A | 12/1995 | Klein | 370/110.1 |
| 5,508,817 A | 4/1996 | Kunigame | 358/402 |
| 5,608,786 A | 3/1997 | Gordon et al. | 379/100 |
| 5,627,764 A | 5/1997 | Schutzman et al. | 364/514 R |
| 5,675,507 A | * 10/1997 | Bobo, II | 709/206 |
| 5,689,642 A | * 11/1997 | Harkins et al. | 709/207 |
| 5,825,865 A | 10/1998 | Oberlander et al. | 379/211 |
| 5,872,926 A | 2/1999 | Levac et al. | 395/200.36 |
| 5,884,262 A | * 3/1999 | Wise et al. | 704/270.1 |
| 6,157,924 A | 12/2000 | Austin | 707/10 |

* cited by examiner

Primary Examiner—Le Hien Luu
(74) Attorney, Agent, or Firm—Michael J. Cummings

(57) ABSTRACT

A invention relates to a system and method for re-transmitting an e-mail message transmitted from a sender to a recipient based upon predetermined criteria. The method including the steps of receiving in a recipients e-mail account an e-mail message transmitted from a sender and interrogating the address block of the e-mail message to determine if predetermined criteria has been met in the sender addressing information portion of the e-mail message. The e-mail message is re-transmitted to the recipient such that the recipient receives at least the messaging information content of the e-mail message at a location other than the recipients intended e-mail address if the predetermined criteria has been met.

13 Claims, 8 Drawing Sheets

Fig. 1

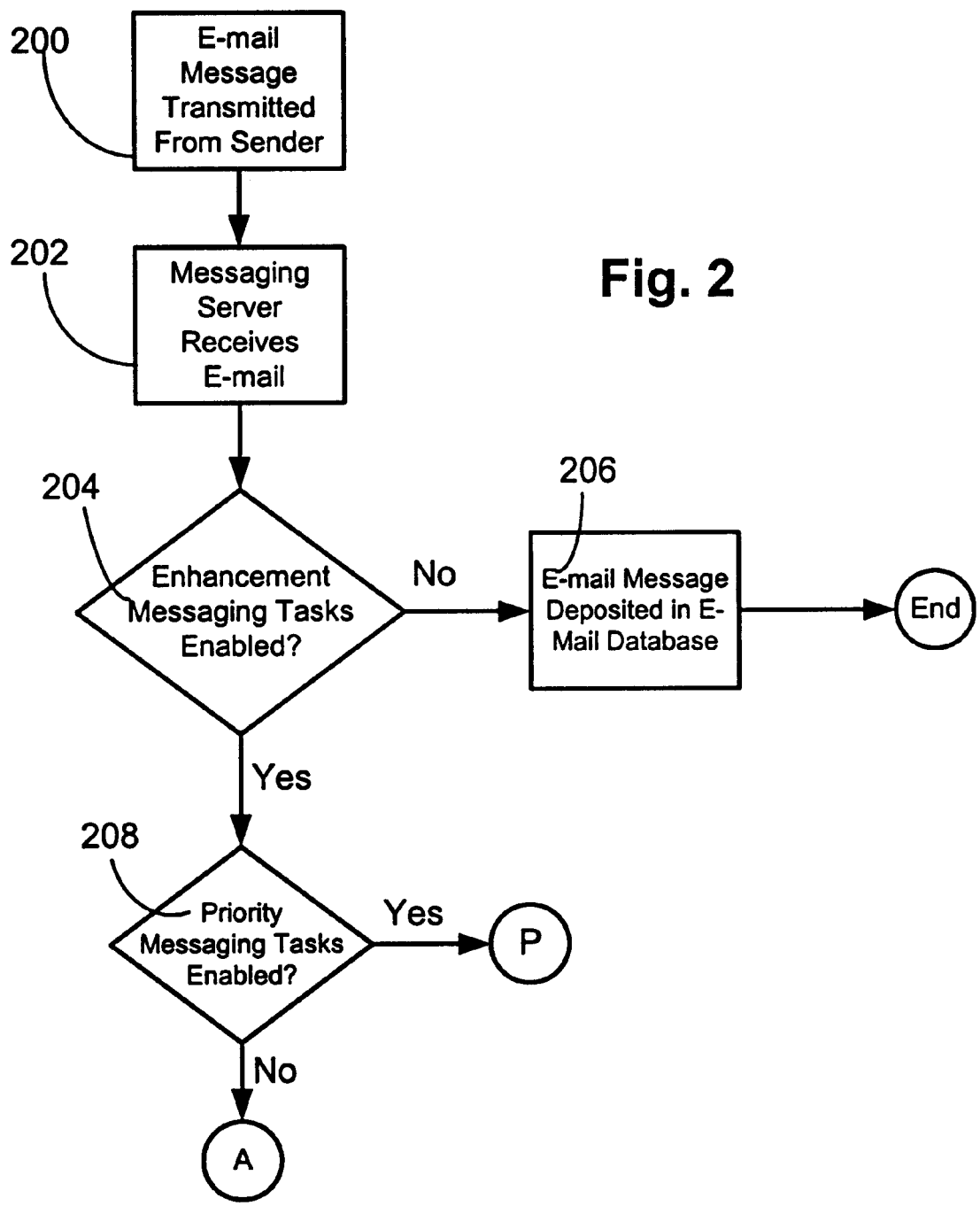

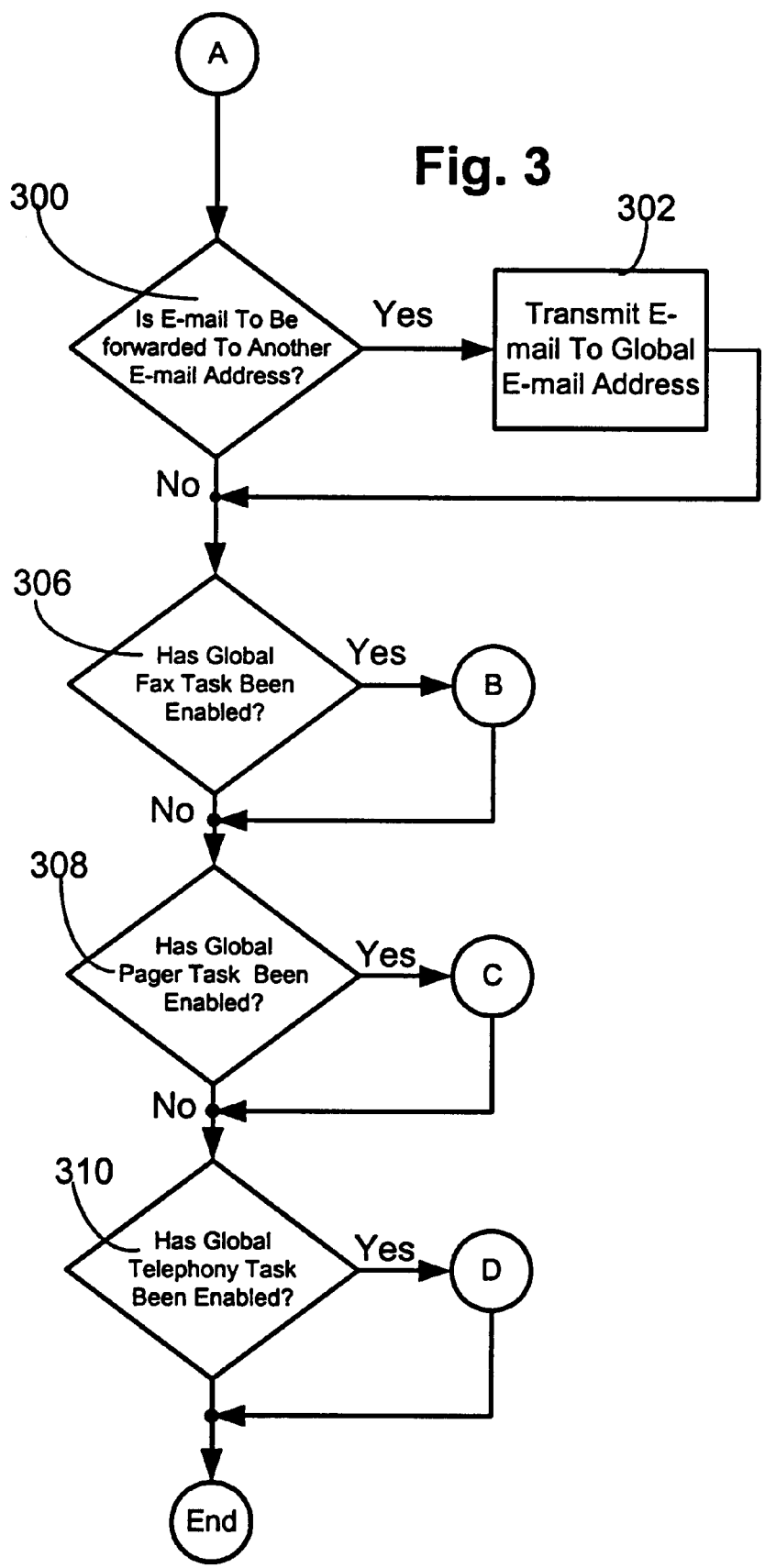

METHOD FOR CONVERTING AN EMAIL MESSAGE TO A DIFFERENT FORMAT AND RETRANSMITTING TO A LOCATION OTHER THAN RECIPIENT ADDRESS INFORMATION IN THE EMAIL MESSAGE

FIELD OF THE INVENTION

The present invention relates to a programmable electronic messaging system, and more particularly to an internet based messaging server programmable to divert an incoming e-mail message to one of a plurality of different electronic delivery mechanisms.

BACKGROUND OF THE INVENTION

As e-mail messaging technology continues to evolve and advance, it is becoming increasingly a more prevalent form of communication. As more and more individuals rely on e-mail as their principle form of communication, it is increasingly becoming important that it's accessibility also continues to evolve.

In the past, e-mail messages were typically transmitted from one computer terminal to another, in which the e-mail message is transmitted from the sender to a recipient, and after being transmitted from the sender, it would typically reside in a messaging server (the e-mail account for the recipient) until such a time as the recipient would access the server to retrieve the recipient's e-mail messages residing in the server. With continuing advancements in communication technology, now not only PC terminals can transmit e-mail messages, but almost any device capable of transmitting electronic data can now both send and retrieve e-mail messages (e.g., cellular telephones, hand-held computer devices having wireless communication capabilities, etc.)

However, eventhough e-mail messages can now be both more easily be sent and retrieved, there are still many instances when an e-mail recipient is not capable of retrieving an e-mail formatted message (e.g., the recipient does not readily have access to an e-mail receiving device). Thus, there still remains a need to improve and expand email accessibility as well as efficiency.

SUMMARY OF THE INVENTION

Accordingly the present invention relates to a system and method for re-transmitting from the recipient's e-mail server an e-mail message transmitted from a sender to a location other then the recipient's intended e-mail address upon the occurrence of predetermined criteria as prescribed by the recipient.

The method includes the steps of providing a storage medium in a messaging server and receiving in a recipients intended e-mail account of the messaging server an e-mail message transmitted from a sender. At least one set of criteria is defined by the recipient which is to be satisfied in the address block of the received e-mail message for initiating a priority messaging task in the messaging server. The address block of the received e-mail message is then interrogating to determine if predetermined criteria from the defined set of criteria has been met.

The e-mail message is then re-transmitted in the messaging server to the recipient such that the recipient receives at least the messaging information content of the e-mail message at a location other than the recipients messaging server in accordance with the priority messaging task if the predetermined criteria has be met in the address block the aforesaid e-mail message.

Additionally the system and method of the present invention further provides converting the messaging information content of the e-mail message to a predetermined communication format other than e-mail format and storing the converted e-mail message in the storage medium. All stored converted e-mail messages are then transmitted so as to be received by a recipient in the predetermined communication when a predetermined number of converted e-mail messages have been stored in the storage medium.

BRIEF DESCRIPTION OF THE DRAWINGS

The above and other objects and advantages of the present invention will become more readily apparent upon consideration of the following detailed description, taken in conjunction with the accompanying drawings, in which like reference characters refer to like parts throughout the drawings and in which:

FIG. 2 is a flow chart depicting the steps taken by messaging server of FIG. 1 for determining if priority and global messaging tasks have been;

FIGS. 3–6 are flow charts depicting the steps taken by the messaging server of FIG. 1 for initiating prescribed global messaging tasks.

DETAILED DESCRIPTION OF THE PREFERRED EMBODIMENT

Figure 1:
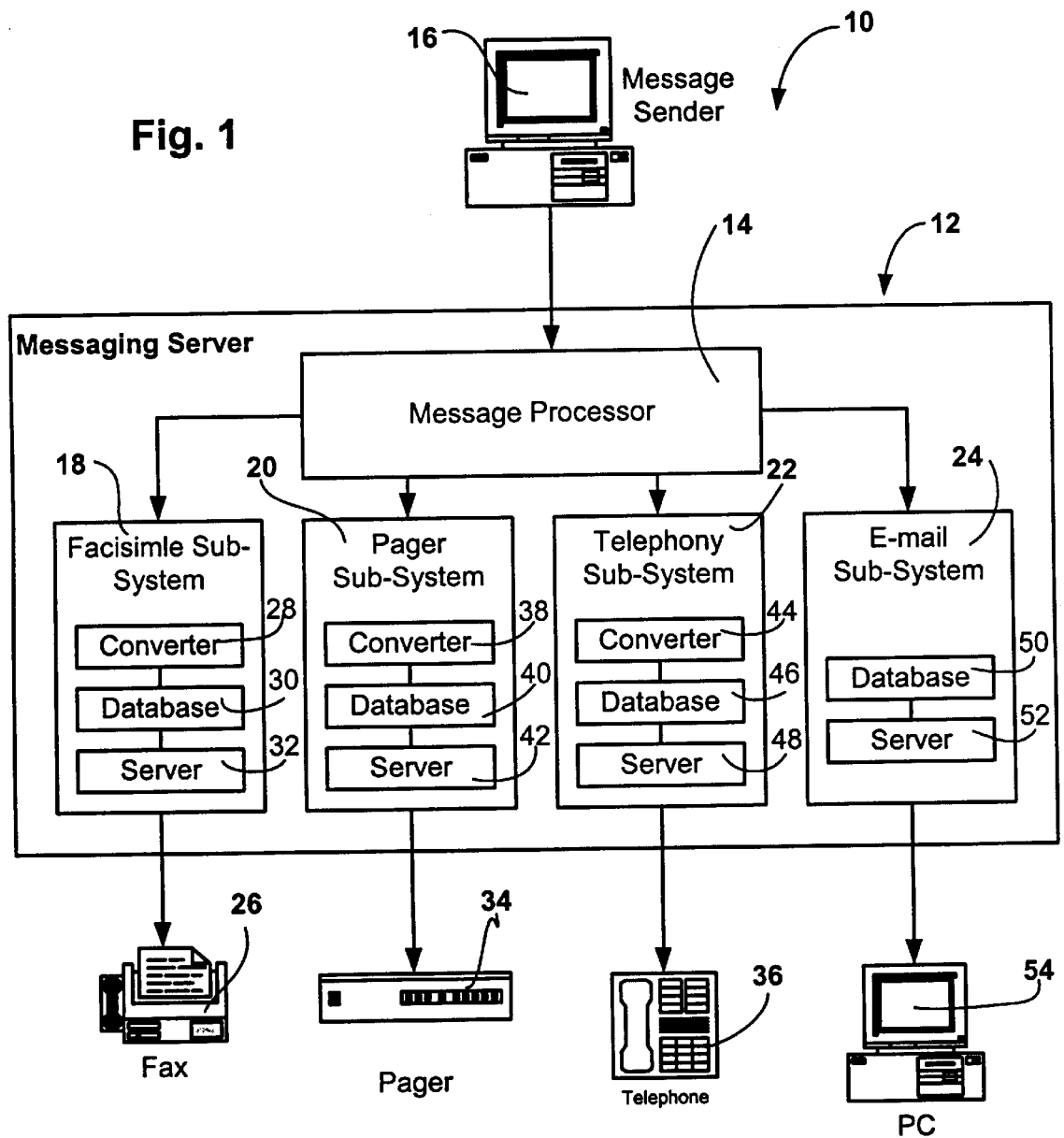
FIG. 1 is a system level block diagram depicting the messaging server embodying the present invention.

With reference to FIG. 1, there is shown in block diagram a messaging system, designated generally at 10, embodying the present invention. Messaging system 10 includes preferably an internet based messaging server 12 having a programmable message processor 14 for initiating the pre-programmed priority and global messaging tasks for subscribing recipients. For clarity of illustration, system 10 is shown to include only one PC-based message sender 16, but it is of course to be appreciated that system 10, and more specifically the messaging server 12, is intended to be coupled to a virtual infinite amount of message senders 16, wherein a message sender 16 can be defined as any type of device capable of transmitting an e-mail message to the message server 16, preferably via the internet.

Message server 12 preferably includes a message processor 14 that initiates the below discussed messaging tasks as prescribed by a subscriber. More particularly, message server 12 is preferably an internet based server having a plurality of subscribers, wherein each subscriber is assigned a unique e-mail address, as is well known. For instance, a first subscriber can be assigned the address: nicholls@pb.com, while a second subscriber can be assigned the address: allport@pb.com. As is conventional, the first portion of the exemplary e-mail addresses (i.e., nicholls and allport) are termed user identifications, which is typically chosen by the subscriber. The second portion of the exemplary e-mail addresses (i.e., pb.com) are termed the domain names which is typically fixed for all subscribers on a common message server 12. Without going into elaborate detail, it is this domain name (i.e., pb.com) that is utilized by Domain Name Servers (DNS) on the internet so as to obtain a numerical TCP/IP address, which TCP/IP address is the location in which the messaging server 12 resides on the internet as translated by internet-based Domain Name Servers. As is still conventional, when a sender transmits an e-mail message to an e-mail address (e.g., nicholls@pb.com), that e-mail message is transmitted to and typically maintained within the message server 12 having the matching domain name (pb.com) in a folder or database dedicated to that subscriber recipient (e.g., nicholls). The recipient subscriber, when appropriately logged onto to the message server 12, is then enabled to retrieve the messages delivered to him. Thus, what is described above is well known to all internet-based e-mail message servers.

Described below is the message server 12 in accordance with the present invention which is configured to not only conventionally deliver an e-mail message to a subscriber, but also convert that e-mail message to another chosen format (e.g., facsimile, pager or telephony) and deliver the message in that format based upon predefined criteria chosen by the subscriber.

Figure 7:
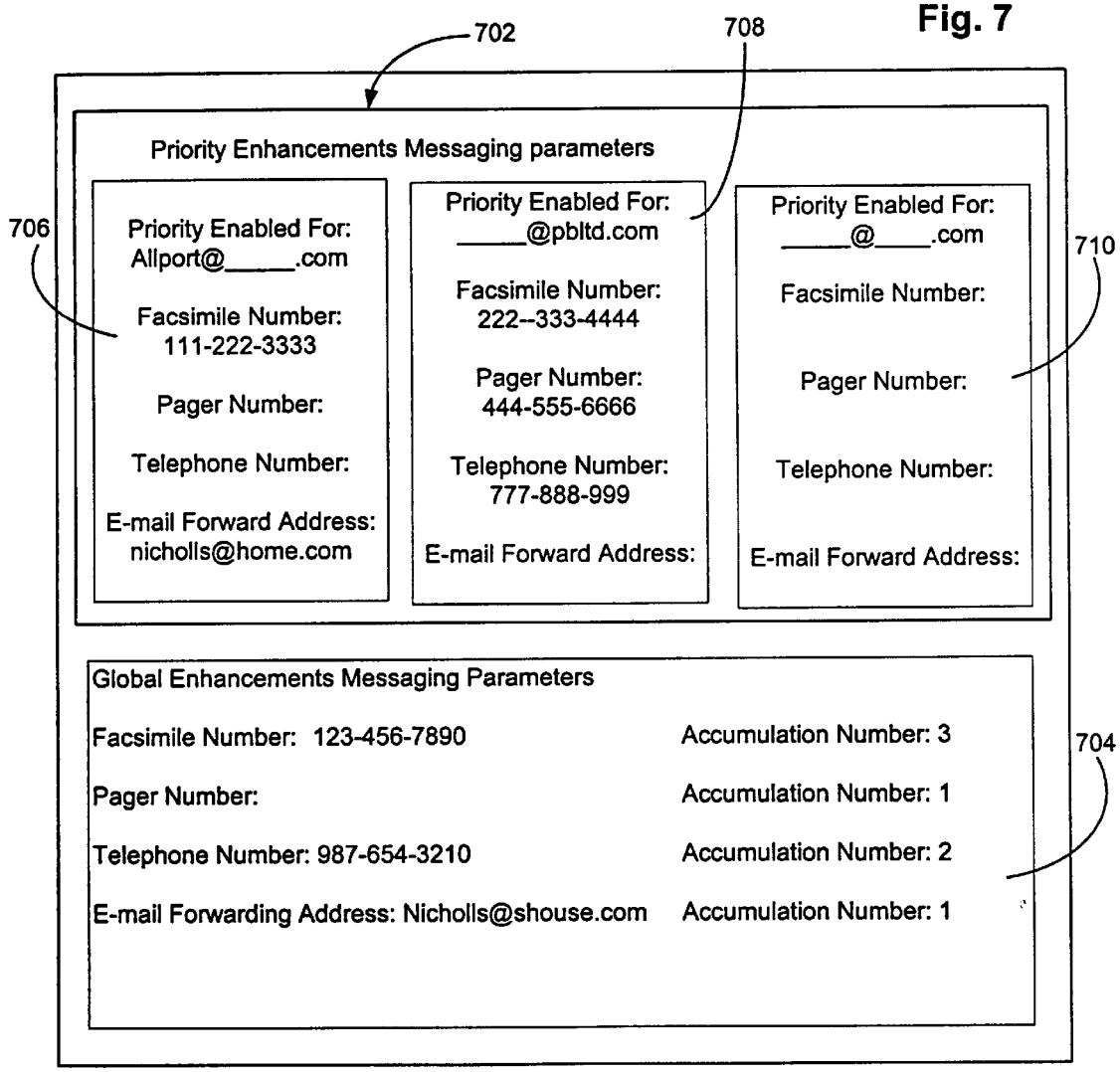
FIG. 7 is a block diagram depicting the prescribed parameters for the priority and global messaging tasks.

As stated above, messaging server 12 includes a programmable message processor 14, which can be programmable in a number of ways. Preferably, processor 14 is programmed by a subscriber via the internet, wherein the subscriber logs onto an internet page and thorough access to the subscriber's account file (which of course is preferably password protected), the subscriber inputs the predefined criteria into his account file (FIGS. 7). The content of this predefined criteria will be readily apparent from the below described operation of messaging server 12. Of course messaging server 12 is not to be understood to be limited to using the internet for its programming, but rather it may be programmed via telephony, facsimile or any other known means for inputting data into a processor.

Message processor 14 is preferably coupled to: a facsimile sub-system 18, a pager sub-system 20, a telephony sub-system 22 and an e-mail sub-system 24, each of which will be discussed in turn below.

Facsimile sub-system 18 is operational to receive an e-mail message transmitted from a sender 16 to the subscriber recipient and convert and transmit the content of the e-mail message to a predetermined facsimile location 26. Facsimile sub-system 18 includes a converter 28 for converting at least the content of the e-mail message from preferably either HTML or ASCII text to a facsimile format such as "group 3." Further included is preferably a facsimile database 30 coupled to the converter 28 for storing the converted facsimile messages. A facsimile server 32 is coupled to the database 30 and is operational to transmit facsimile messages to a predetermined facsimile location 26. A more detailed explanation of the operation of the facsimile sub-system 18 will be given below in conjunction with the operation of the messaging server 12.

Similarly, both the pager sub-system 20 and telephony sub-system 22 are operational to receive an e-mail message transmitted from a sender 16 to the subscriber recipient and convert and transmit the content of the e-mail message to a predetermined mobile pager location 34 or a telephony location 36, respectively. Regarding the pager sub-system 20, it includes a converter 38 for converting at least the content of the e-mail message from preferably either HTML or ASCII text to a pager format such as alpha-numeric characters or ASCII text. Further included is preferably a pager database 40 coupled to the converter 38 for storing converted pager messages. A pager server 42 is coupled to the database 40 and is operational to transmit facsimile messages to a predetermined mobile pager 34.

In regards to the telephony sub-system 22, it similarly includes a converter 44 for converting at least the content of the e-mail message from preferably either HTML or ASCII text to a audio voice message format using preferably known voice recognition techniques. Further included is preferably an audio database 46 coupled to the converter 44 for storing the converted audio voice messages. A telephony server 48 is coupled to the database 46 and is operational to transmit audio voice messages to a predetermined telephony location 36. A more detailed explanation of the operation of both the pager and telephony sub-systems 20 and 22 will also be given below in conjunction with the operation of the messaging server 12.

With regards to the e-mail sub-system 24, it is operational to receive an e-mail message transmitted from a sender 16 to the subscriber recipients e-mail address that is associated with the messaging server 12 (e.g., nicholls@pb.com) and retransmit that message to another predetermined e-mail address (e.g., nicholls@home.com). E-mail sub-system 24 includes an e-mail database 50 for storing the newly addressed-mail messages and is coupled to an e-mail server for transmitting the newly addressed e-mail messages to predetermined e-mail address locations 54. It is to be appreciated that each predetermined e-mail address location 54 includes a device capable or receiving an e-mail message, such as a PC, cellular telephone or hand-held PC-type device.

With the components of the messaging server 12 being described above, it's preferred method of operation will now be discussed. With reference to FIG. 2, and with continued reference to FIG. 1, a sender transmits an e-mail message from the senders location 16 (step 200) to the recipients e-mail address residing in the messaging server 12 (step 202). A determination is then made in the message processor 14 as to whether the recipient has enabled any "messaging tasks" (step 204). As will become apparent below, messaging tasks are defined as converting and/or re-transmitting the E-mail message based upon the subscribers criteria as pre-programmed in the processor 14. If none are enabled, the e-mail message is deposited in an e-mail database 50 corresponding with the e-mail address the message was addressed to (e.g., nicholls@pb.com) (step 206).

If messaging tasks are enabled, a determination is first made as to whether the recipient has enabled any "Priority Features" (step 208) in association with the received e-mail message. Priority features are defined as the immediate performance of a chosen enhancement feature when an e-mail message is received from a predetermined sender. For example, a subscriber may program the processor 14 to perform a specific task for all e-mail messages having "Allport" appearing in the user identification (e.g. Allport@work.com). Alternatively, a subscriber may program the processor 14 to perform a specific task for all e-mail messages being sent from the domain name "PBltd" (e.g., scottbr@PBltd.com). If priority has not been chosen for the received e-mail message, then it is processed in accordance with the chosen global messaging tasks as described in reference to FIG. 3 (subroutine "A").

Figure 2A:
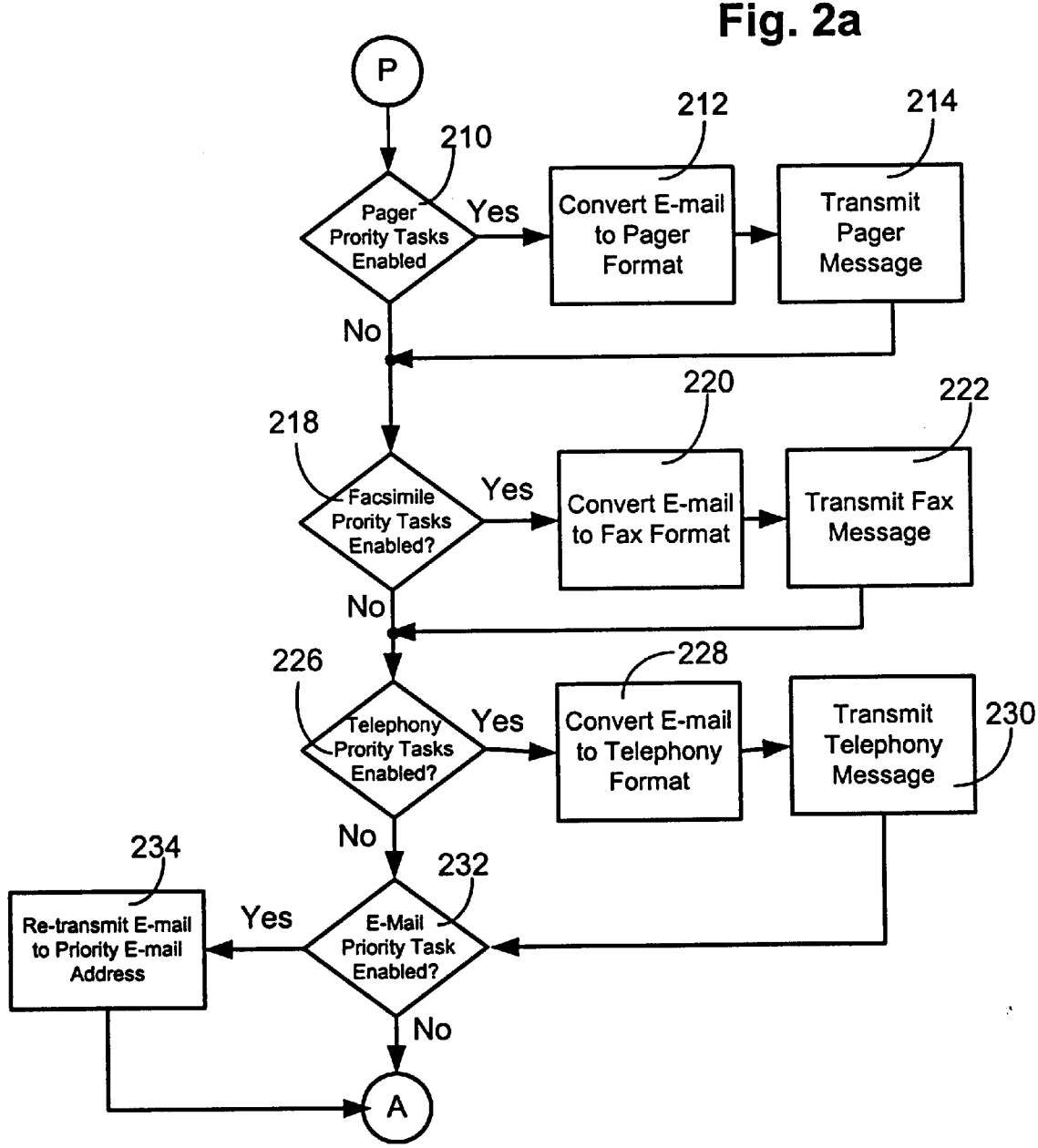
FIG. 2a is a flow chart depicting the steps taken for initiating prescribed priority messaging tasks.

If it is determined that priority has been chosen for the received e-mail message, the determination and performance of the chosen priority messaging task(s) are then initiated as discussed with reference to subroutine "P" of FIG. 2a. Preferably, a determination is first made as to whether a pager feature has been enabled (step 210). If no, the facsimile determination is then made (step 218). If the pager feature has been enabled, then at least the message content of the e-mail message is converted to a pager format by the converter 38 (step 212) in the pager sub-system 20. And that pager message is then transmitted to a predetermined pager 34 (preferably in dependence upon a selected telephone number that corresponds to a chosen pager), via pager server 42 (step 214).

If the pager priority task was not enabled for the received e-mail message (step 210), or after initiation of the pager priority messaging tasks (steps 212 and 214), a determination is then made as whether the facsimile priority messaging tasks has been enabled for the received e-mail message (step 218). If no, the telephony determination is then made (step 226). If the facsimile priority messaging task has been enabled, then at least the message content of the e-mail message is converted to a facsimile format by the converter 28 (step 220) in the facsimile sub-system 18. And that facsimile message is then transmitted to a predetermined facsimile device 26 (preferably in dependence upon a selected telephone number that corresponds to a chosen facsimile device), via facsimile server 32 (step 222).

If the facsimile priority messaging task was not enabled for the received e-mail message (step 218), or after initiation of the facsimile priority messaging tasks (steps 220 and 222), a determination is then made as whether the telephony priority messaging tasks has been enabled for the received e-mail message (step 226). If yes, then at least the message content of the e-mail message is converted to an audio format by the voice recognition converter 44 (step 228) in the telephony sub-system 22. And that audio message is then transmitted to a predetermined telephone location 36 (preferably in dependence upon a selected telephone number that corresponds to a chosen device having the capability to broadcast the audio message such as a conventional telephone or properly configured PC), via telephony server 48 (step 230). A determination is then made as to whether the e-mail priority messaging task has also been chosen for the received e-mail message (step 232).

If the telephony priority messaging task was not enabled for the received e-mail message (step 226) and/or the e-mail priority messaging task has additionally been chosen for the received e-mail message (232), then at least the messaging content of the received e-mail message is re-transmitted to another e-mail address as determined by the subscriber (step 234). The above priority feature then terminates in regards to the present received e-mail, and is again initiated upon receipt of another e-mail message if the predetermined priority criteria has been satisfied. In regards to the present e-mail message, it is then processed in accordance with the pre-programmed global messaging tasks as discussed in reference to subroutine "A" of FIG. 3. It is to be appreciated that if the above-described priority feature is initiated for another received e-mail message, the priority messaging parameters need not be the same, as will be discussed further below.

For example, and with reference to FIG. 7, a subscriber (i.e., nicholls@pb.com) can program the processor 400, in regards to the aforesaid priority messaging parameters (block 702) differently for messages received having the user identification name "allport" compared to messages received having the domain name "pbltd." Thus, if a message is sent to the subscriber (i.e., nicholls@pb.com) from allport@home.com then the message portion of the received e-mail may be faxed to the subscriber's home facsimile machine (e.g., 111-222-3333) and retransmitted to the subscribers home address (i.e., nicholls@home.com) (block 706). In comparison, if a message is sent to the subscriber (i.e., nicholls@pb.com) from scottbr@pbltd.com then the message portion of the received e-mail may be faxed to the subscriber's work facsimile machine (e.g., 222-333-4444) and transmitted to the subscribers pager (e.g., 444-555-6666) as well as the subscribers home telephone number (e.g., 777-888-9999) (block 708). In the event that an e-mail message is received from a sender meeting two different preprogrammed criteria allport@pbltd.com, each having their own priority messaging parameters, then the priority messaging task of FIG. 2 defaults to the parameters that correspond to the user identification (block 706). And of course if the sender information associated with a received e-mail message meets none of the aforementioned preprogrammed priority criteria (e.g., house@work.com) then that e-mail message is then sent to the global messaging tasks program (step 208), as explained below with reference to subroutine "A" of FIG. 3. It is thus to be appreciated that a plurality of different priority criteria can be preprogrammed into processor 14, each having unique messaging parameters.

If the received e-mail message does not satisfy any of the programmed priority messaging parameters, or the priority feature has not been enabled (step 208), the received e-mail message is then processed in accordance with the global messaging tasks as shown in subroutine "A" of FIG. 3. Like the above-described priority messaging tasks, the global messaging tasks are operational to also convert and/or re-transmit the received e-mail message to another location (s), other then the intended location. But unlike the priority messaging tasks of FIG. 2a, the global messaging tasks do not distinguish between received e-mail messages for determining what preprogrammed messaging tasks are to be initiated. For instance, if the facsimile feature has been enabled, then all received e-mail messages are transmitted to a common facsimile location.

With reference to FIG. 3, processor 14 (FIG. 1) first determines if the received e-mail message is to be transmitted to another e-mail address (step 300). If yes, then at least the messaging content of the received e-mail message is re-transmitted to another e-mail address, via e-mail server 52, as determined by the subscriber (step 302) and as pre-programmed in accordance with the global messaging tasks. A determination is then made as to whether the global facsimile feature has been enabled (step 306).

Figure 4:
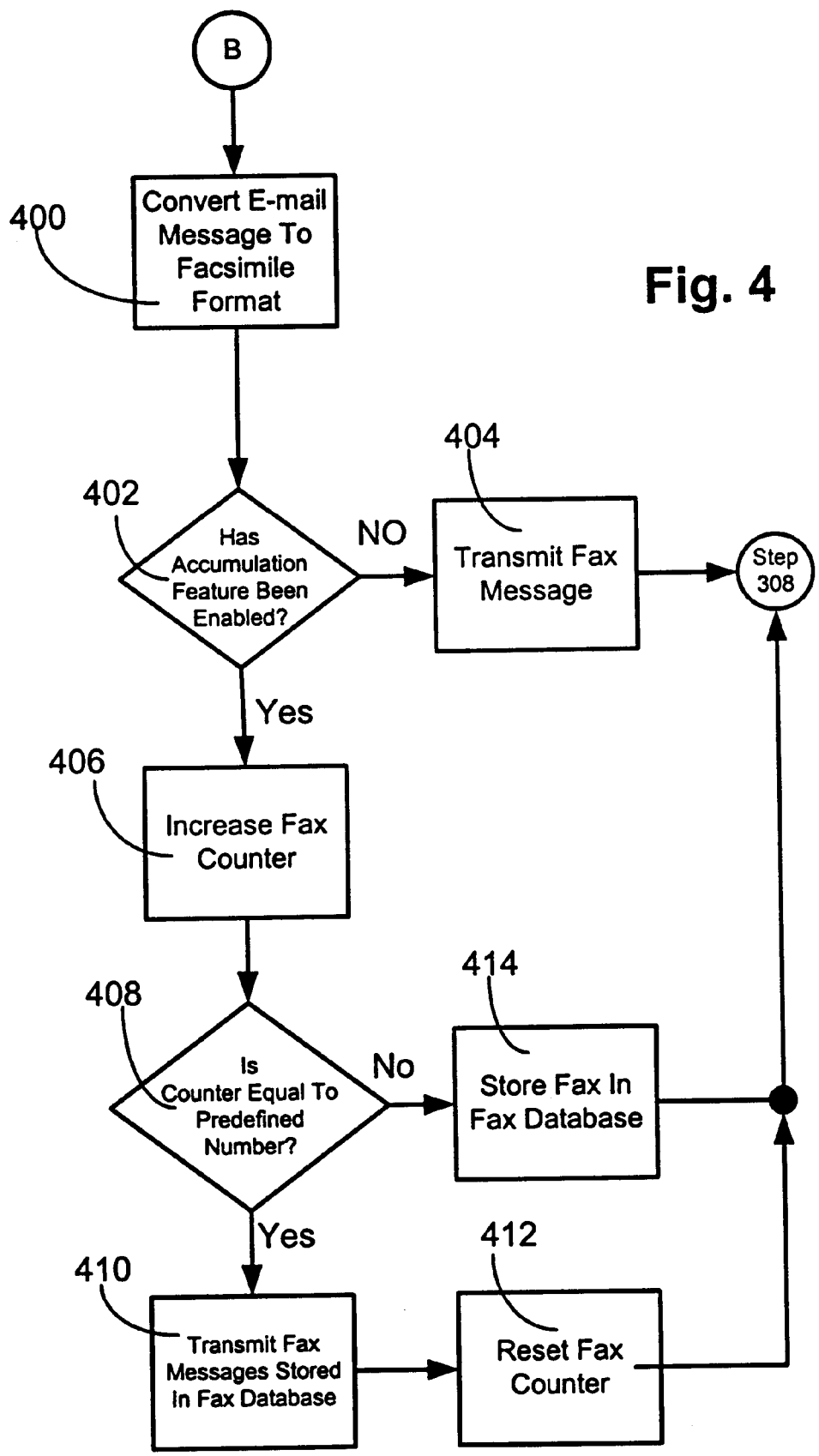

If the e-mail global feature is not enabled (step 300) or after the e-mail feature has been initiated (step 302), a determination is then made as to whether the global facsimile feature has been enabled (step 306). If yes, and with reference to subroutine "B" of FIG. 4, the e-mail message is then converted to a facsimile format, via facsimile converter 28 (step 400). A determination is then made as to whether the facsimile accumulation feature has been enabled (step 402). If no, then the facsimile formatted message is transmitted to a predetermined facsimile location as pre-programmed by the subscriber, via facsimile server 32 (step 404).

If the facsimile accumulation feature has been enabled (step 402) then a facsimile counter is increased by one increment (step 406), preferably in processor 14, and a determination is then made as to whether the present facsimile counter equals a predefined facsimile counter number (step 408). This facsimile counter number is predefined by the subscriber and corresponds to the number of facsimile formatted messages that must be collected before they are all successively transmitted to the predetermined facsimile location 26. If the present facsimile counter number equals the predefined facsimile counter number, then all the facsimile formatted messages stored in the facsimile database 30 are transmitted to a predetermined facsimile location 26 as pre-programmed by the subscriber, via facsimile server 32 (step 410). The present facsimile counter is then reset to zero and all facsimile formatted messages contained in the facsimile database 30 are preferably deleted (step 412). If the present facsimile counter number does not equals the predefined facsimile counter number (step 408), then the facsimile formatted message is stored in the facsimile database 30 (step 414) and these stored messages are not transmitted until the number of stored messages equals the predefined facsimile counter number.

Figure 5:
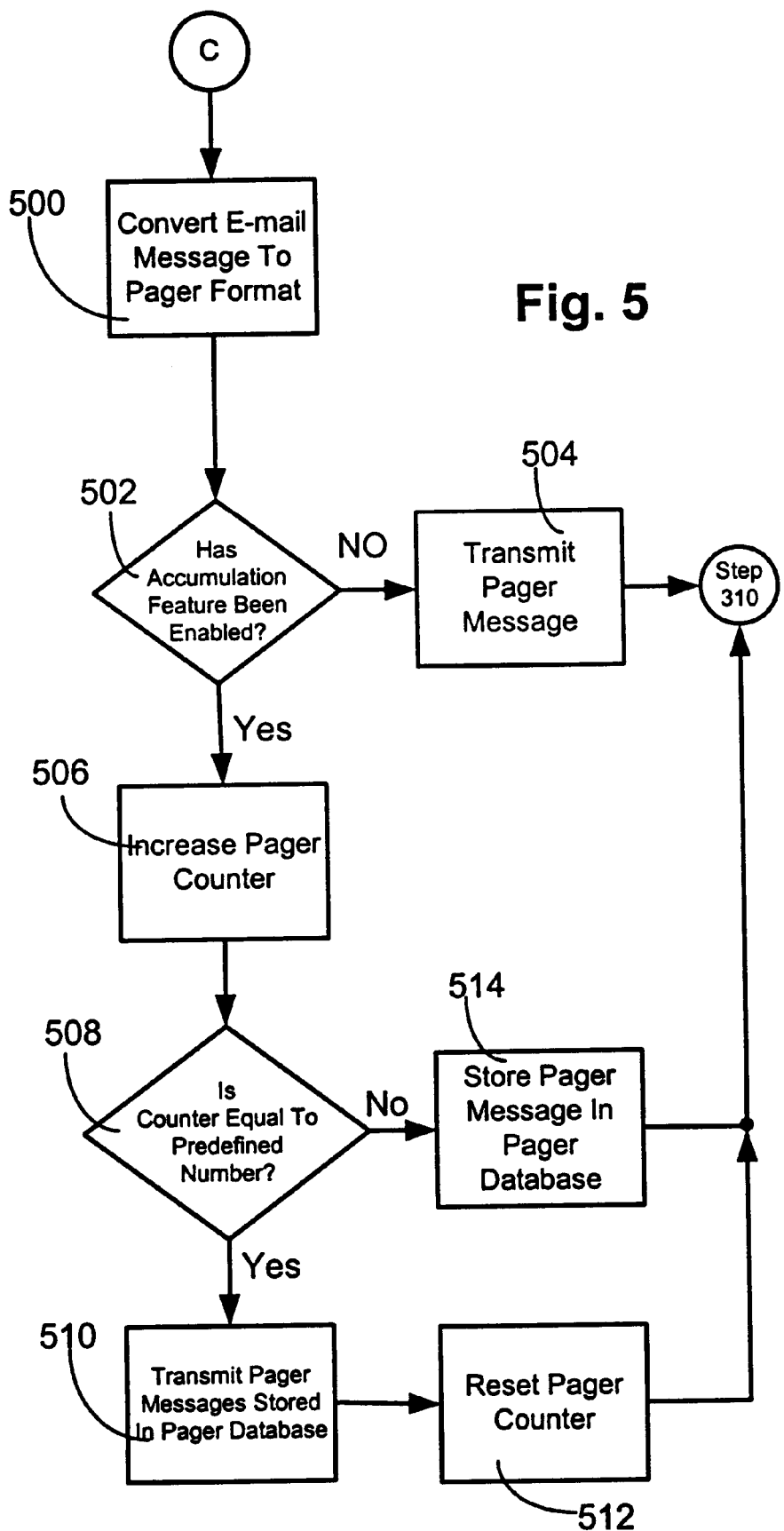

Returning reference to FIG. 3, if the facsimile global messaging task was not enabled (step 306) or after the facsimile messaging task has been initiated (subroutine "B"), a determination is then made as to whether the global pager messaging task has been enabled (step 308). If yes, and with reference to subroutine "C" of FIG. 5, the e-mail message is then converted to a pager format, via pager converter 38 (step 500). A determination is then made as to whether the pager accumulation feature has been enabled (step 502). If no, then the page formatted message is transmitted to a predetermined pager 34 as pre-programmed by the subscriber, via pager server 42 (step 504).

If the pager accumulation feature has been enabled (step 502) then a pager counter is increased by one increment (step 506), preferably in processor 14, and a determination is then made as to whether the present pager counter equals a predefined pager counter number (step 508). This pager counter number is predefined by the subscriber and corresponds to the number of pager formatted messages that must be collected before they are all successively transmitted to the predetermined pager. If the present pager counter number equals the predefined pager counter number, then all the pager formatted messages stored in the pager database 40 are transmitted to a predetermined pager 34 as preprogrammed by the subscriber, via pager server 42 (step 510). The present pager counter is then reset to zero and all pager formatted messages contained in the pager database 40 are preferably deleted (step 512). If the present pager counter number does not equal the predefined pager counter number (step 508), then the pager formatted message is stored in the pager database 40 (step 514) and these stored messages are not transmitted until the number of stored messages equals the predefined pager counter number.

Figure 6:
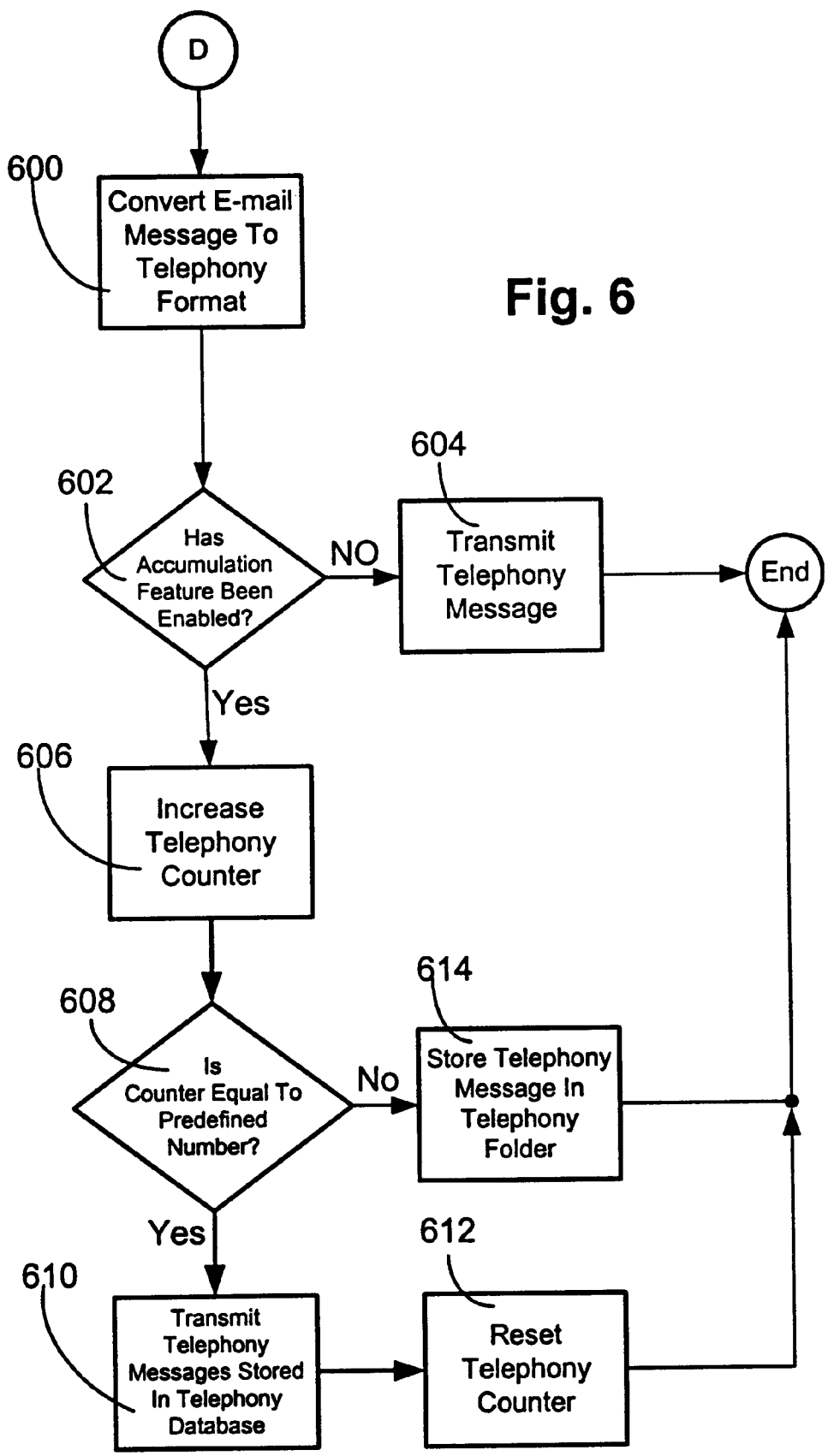

Again with returning reference to FIG. 3, if the global pager messaging task was not enabled (step 308) or after the global pager messaging task has been initiated (subroutine "C"), a determination is then made as to whether the global telephony messaging task has been enabled (step 310). If yes, and with reference to subroutine "D" of FIG. 6, the e-mail message is then converted to a telephony format, via telephony converter 44 (step 600). A determination is then made as to whether the telephony accumulation feature has been enabled (step 602). If no, then the telephony formatted message is transmitted to a predetermined telephone location 36 as pre-programmed by the subscriber, via telephony server 48 (step 604).

If the telephony accumulation feature has been enabled (step 602) then a telephony counter is increased by one increment (step 606), preferably in processor 14, and a determination is then made as to whether the present telephony counter equals a predefined telephony counter number (step 608). This telephony counter number is predefined by the subscriber and corresponds to the number of telephony formatted messages that must be collected before they are all successively transmitted to the predetermined telephone location 36. If the present telephony counter number equals the predefined telephony counter number, then all the telephony formatted messages stored in the telephony database 46 are transmitted to a predetermined telephone as preprogrammed in accordance with the global enhancement features, via telephony server 48 (step 610). The present telephony counter is then reset to zero and all telephony formatted messages contained in the telephony database 46 are preferably deleted (step 612). If the present telephony counter number does not equal the predefined telephony counter number (step 608), then the telephony formatted message is stored in the telephony database 46 (step 614) and these stored messages are not transmitted until the number of stored messages equals the predefined telephony counter number.

It is to be appreciated that the preprogrammed messaging parameters for the aforesaid global messaging tasks can be either the same or different than those for the priority messaging tasks as discussed above with reference to FIG. 2a. To illustrate this, reference is again made to FIG. 7, which depicts the preprogrammed messaging parameters, as chosen by a subscriber and retained in the processor 14 of the messaging server 12. In continuance of the exemplary scenario described above with reference to the priority messaging parameters (block 702), discussion will now be given in regards to the preprogrammed global enhancements messaging parameters (block 704). With the priority messaging parameters remaining the same as shown in FIG. 7 and discussed above (block 702), a subscriber can program the processor 14 with the following global enhancements messaging parameters (block 704):

(1) all received e-mail messages are to be faxed to the subscribers summer home facsimile number (i.e., 123-456-7890) after three messages have accumulated in the facsimile database 30;

(2) all received e-mail messages are to be telephoned in audio format to the subscribers summer home facsimile number (i.e., 987-654-3210) after two messages have accumulated in the telephony database 30; and (3) all received e-mail messages are to be e-mailed to the subscribers summer home e-mail address (i.e., Nicholls@shouse.com).

For instance, if an e-mail message is received from Allport@work.com, then the messaging parameters of priority messaging routine of block 706 are performed in addition to those of the aforesaid global messaging routine, block 704. Alternatively, if an e-mail message is received from scoftsu@pbltd.com the messaging parameters of priority messaging routine of block 708 are performed in addition to those of the aforesaid global messaging routine, block 704. And further, if an e-mail message is received from Cookgr@play.com then no priority messaging steps are taken (since the received message does not satisfied any of the preprogrammed criteria (block 702), but the global messaging features of the preprogrammed global messaging routine (block 704) are nevertheless performed (since there is no criteria to satisfy).

In summary, an internet based e-mail system has been described for providing dynamic messaging capabilities for e-mail messages received in regards to subscribers of the e-mail system. Although the present invention has been described with emphasis on a particular embodiment, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for re-transmitting an e-mail message transmitted from a sender to a recipient based upon predetermined criteria, the e-mail message including a message block having messaging information and an address block identifying both recipient and sender addressing information, the method comprising the steps of:

receiving in a recipients e-mail account an e-mail message transmitted from a sender;

interrogating the address block of the e-mail message to determine if predetermined criteria has been met in the sender addressing information portion of the e-mail message; and re-transmitting the e-mail message to the recipient such that the recipient receives at least the messaging information content of the e-mail message at a location other than the recipients intended e-mail account if the predetermined criteria has been met;

wherein the re-transmitting step includes the step of converting at least the messaging information content of the e-mail message to a predetermined communication format other than e-mail format and re-transmitting the converted e-mail messaging information such that it is received at a recipients location in the predetermined communication format.

2. A method as recited in claim 1 wherein in the re-transmitting step at least the messaging information content of the e-mail message is converted to a communication format chosen from the group consisting of a telephony format, a facsimile format and a pager format.

3. A method as recited in claim 2 wherein in the re-transmitting step at least the messaging information content of the e-mail message is converted to at least two different communication formats other than e-mail format.

4. A method for re-transmitting an e-mail message transmitted from a sender to a recipient based upon predetermined criteria, the e-mail message including a message block having messaging information and an address block identifying both recipient and sender addressing information, the method comprising the steps of:

providing a storage medium;

receiving in a recipients intended e-mail account location an e-mail message transmitted from a sender;

converting at least the messaging information content of the e-mail message to a predetermined communication format other than e-mail format;

storing the converted e-mail message in the storage medium;

transmitting all converted e-mail messages stored in the storage medium so as to be received by a recipient in the predetermined communication format at a location other than the recipients intended e-mail account when a predetermined number of converted e-mail messages have been stored in the storage medium.

5. A method as recited in claim 4 wherein the converting step converts at least the messaging information content of the e-mail message to a communication format chosen from the group consisting of a telephony format, a facsimile format and a pager format.

6. A method for re-transmitting an e-mail message transmitted from a sender to a recipient based upon predetermined criteria, the e-mail message including a message block having messaging information and an address block identifying both recipient and sender addressing information, the method comprising the steps of:

providing a plurality of storage mediums;

receiving in a recipients intended e-mail account location an e-mail message transmitted from a sender;

converting at least the messaging information content of the e-mail message to one of a plurality of predetermined communication formats other than e-mail format;

storing each converted e-mail message in one of the plurality of storage mediums wherein each storage medium contains converted e-mail messages of a like communication format; and transmitting all converted e-mail messages stored in one of the plurality of storage mediums so as to be received by a recipient in the predetermined communication format at a location other than the recipients intended e-mail account when a predetermined number of converted e-mail messages have been stored in the one of the plurality of storage mediums.

7. A method as recited in claim 6 wherein the converting step converts at least the messaging information content of the e-mail message to a communication format chosen from the group consisting of a telephony format, a facsimile format and a pager format.

8. A method as recited in claim 6 further including the step of deleting the e-mail message from the recipients intended e-mail account without user intervention.

9. A method for re-transmitting an e-mail message transmitted from a sender to a recipient based upon predetermined criteria, the e-mail message including a message block having messaging information and an address block identifying both recipient and sender addressing information, the method comprising the steps of:

defining at least two different sets of criteria to be satisfied in the address block of the e-mail message for initiating messaging tasks wherein each set of criteria has unique associated messaging tasks;

receiving in a recipients intended e-mail account location an e-mail message transmitted from a sender;

interrogating the address block of the e-mail message to determine if predetermined criteria from at least one of said two different sets of criteria has been met in the sender addressing information portion of the e-mail message; and re-transmitting the e-mail message to the recipient such that the recipient receives at least the messaging information content of the e-mail message at a location other than the recipients intended e-mail account in accordance with the messaging tasks associated with one of the said two different sets of criteria that has be met in the sender addressing information portion of the e-mail message;

wherein the re-transmitting step includes the step of converting at least the messaging information content of the e-mail message to a predetermined communication formation other than e-mail format and re-transmitting the converted e-mail messaging information such that it is received at a recipient location in the predetermined communication format.

10. A method as recited in claim 9 wherein in the re-transmitting step at least the messaging information content of the e-mail message is converted to a communication format chosen from the group consisting of a telephony format, a facsimile format and a pager format.

11. A method as recited in claim 10 wherein in the re-transmitting step at least the messaging information content of the e-mail message is converted to at least two different communication formats other than e-mail format.

12. A method for re-transmitting an e-mail message transmitted from a sender to a recipient based upon predetermined criteria, the e-mail message including a message block having messaging information and an address block identifying both recipient and sender addressing information, the method comprising the steps of:

provide a storage medium;

receiving in a recipients intended e-mail account location an e-mail message transmitted from a sender;

defining at least one set of criteria to be satisfied in the address block of the e-mail message for initiating a priority messaging task;

interrogating the address block of the e-mail message to determine if predetermined criteria from at the least one set of criteria has been met in the sender addressing information portion of the e-mail message;

re-transmitting the e-mail message to the recipient such that the recipient receives at least the messaging information content of the e-mail message at a location other than the recipients intended e-mail account in accordance with the priority messaging task if the predetermined criteria has be met in the sender addressing information portion of the e-mail message;

converting at least the messaging information content of the e-mail message to a predetermined global communication format other than e-mail format;

storing the converted e-mail message in the storage medium;

transmitting all converted e-mail messages stored in the storage medium so as to be received by a recipient in the predetermined communication format at a location other than the recipients intended e-mail account when a predetermined number of converted e-mail messages have been stored in the storage medium.

13. A method as recited in claim 12, wherein the global communication format is different than a communication format used in association with the priority messaging task.

* * * * *